US012763653B2

(12) United States Patent
Grelle et al.

(10) Patent No.: US 12,763,653 B2
(45) Date of Patent: Oct. 13, 2026

(54) ROTOR FOR AN EXTERNALLY EXCITED SYNCHRONOUS MACHINE

(71) Applicant: MAHLE International GmbH, Stuttgart (DE)

(72) Inventors: Thorsten Grelle, Stuttgart (DE); Peter Kozlowski, Stuttgart (DE); Florian Osdoba, Stuttgart (DE); Penyo Topalov, Stuttgart (DE); Philipp Zimmerschied, Stuttgart (DE)

(73) Assignee: Mahle International GmbH (DE)

( * ) Notice: Subject to any disclaimer, the term of this patent is extended or adjusted under 35 U.S.C. 154(b) by 224 days.

(21) Appl. No.: 18/704,914

(22) PCT Filed: Sep. 6, 2022

(86) PCT No.: PCT/EP2022/074679
§ 371 (c)(1),
(2) Date: Apr. 25, 2024

(87) PCT Pub. No.: WO2023/072463
PCT Pub. Date: May 4, 2023

(65) Prior Publication Data

US 2025/0015693 A1 Jan. 9, 2025

(30) Foreign Application Priority Data

Oct. 27, 2021 (DE) ..................... 10 2021 212 152.7

(51) Int. Cl.
*H02K 3/51* (2006.01)
*H01F 27/32* (2006.01)
(Continued)

(52) U.S. Cl.
CPC ........... *H02K 19/12* (2013.01); *H01F 27/323* (2013.01); *H01F 38/18* (2013.01); *H02K 7/003* (2013.01); *H02K 7/04* (2013.01); *H02K 11/042* (2013.01)

(58) Field of Classification Search
CPC .......... H02K 19/12; H02K 7/003; H02K 3/51; H01F 27/323
See application file for complete search history.

(56) References Cited

U.S. PATENT DOCUMENTS 4,203,044 A 5/1980 Linscott, Jr.
9,979,256 B2 5/2018 Bulatow
(Continued)

FOREIGN PATENT DOCUMENTS

DE 202012002024 U1 3/2012
DE 102014202719 A1 8/2015
(Continued)

OTHER PUBLICATIONS

English abstract for DE-102014202719.
Japanese Office Action dated May 8, 2026 for Japanese Patent Application No. 2024-523858.

*Primary Examiner* — Cortez M Cook
(74) *Attorney, Agent, or Firm* — Fishman Stewart PLLC

(57) ABSTRACT

A rotor for an externally excited synchronous machine. The rotor includes rotor windings arranged on a rotor shaft, a balancing ring, and a rectifier electrically connected to the rotor windings. On the balancing ring, a rotary transformer rotor of a rotary transformer with a secondary coil is arranged. The rotary transformer rotor projects from the balancing ring in an axial direction.

16 Claims, 2 Drawing Sheets

Figure 1:
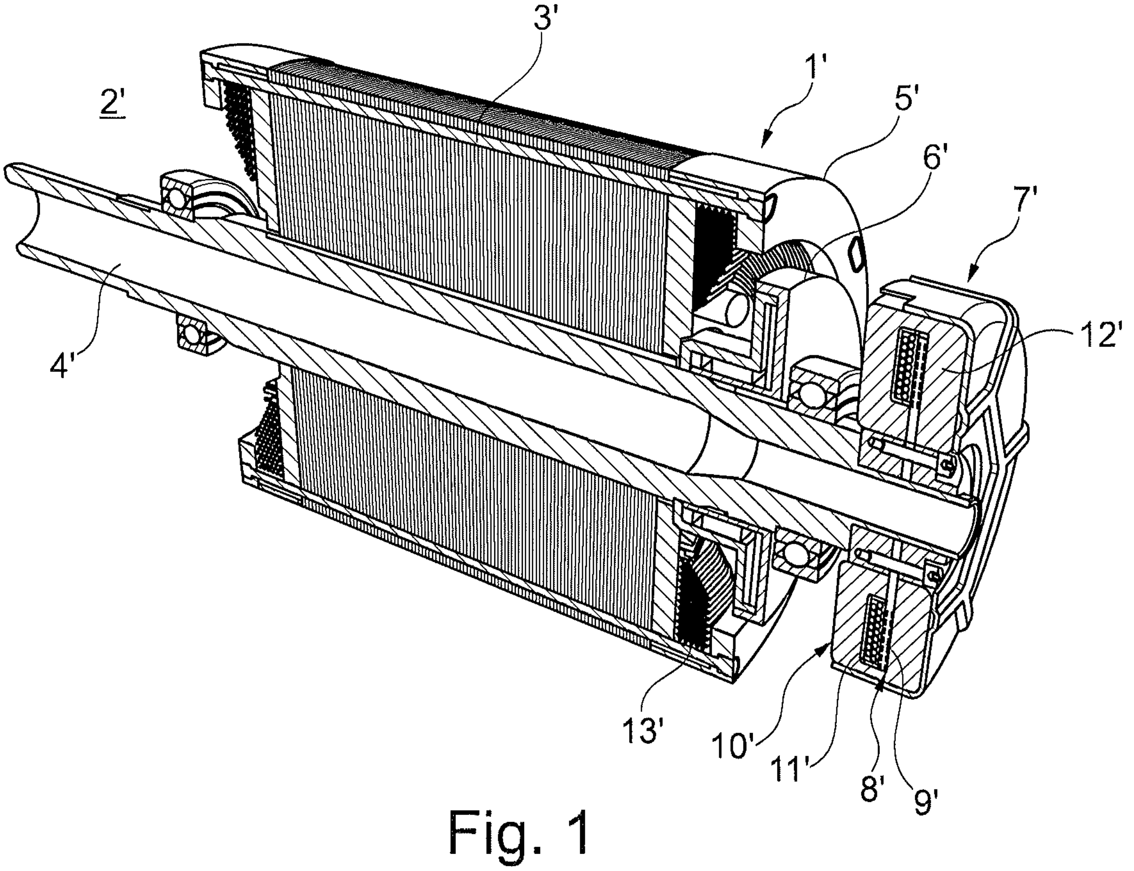

(51) Int. Cl.

| | |
|---|---|
| ***H01F 38/18*** | (2006.01) |
| ***H02K 7/00*** | (2006.01) |
| ***H02K 7/04*** | (2006.01) |
| ***H02K 11/042*** | (2016.01) |
| ***H02K 19/12*** | (2006.01) |

(56) References Cited

U.S. PATENT DOCUMENTS

| | | | | |
|---|---|---|---|---|
| 11,489,420 | B2 | 11/2022 | Bulatow | |
| 2020/0195104 | A1* | 6/2020 | Bulatow | .................. H02K 3/51 |

FOREIGN PATENT DOCUMENTS

| | | | |
|---|---|---|---|
| DE | 102017214776 | A1 | 4/2018 |
| JP | S5497707 | A | 8/1979 |

* cited by examiner

ROTOR FOR AN EXTERNALLY EXCITED SYNCHRONOUS MACHINE

CROSS-REFERENCE TO RELATED APPLICATIONS

This application claims priority to International Patent Application No. PCT/EP2022/074679 filed Sep. 6, 2022, which also claims priority to German Patent Application DE 10 2021 212 152.7 filed Oct. 27, 2021, the contents of each of which is hereby incorporated by reference in its entirety.

TECHNICAL FILED

The invention relates to a rotor for an externally excited synchronous machine. In addition, the invention relates to an electric externally excited synchronous machine having such a rotor.

BACKGROUND

So-called externally excited electric synchronous machines require in their rotor an electric direct current for generating the magnetic rotor field. This process is referred to as "rotor excitation". In conventional synchronous machines, the electric rotary transformer rotor current is transmitted with the help of so-called carbon brush slippering contacts to the rotating rotor. Disadvantageous in this proves to be that the carbon brushes, especially at high rotational speeds wear out and in the process can produce undesirable electrically conductive carbon dust.

Alternatively to such a transmission of the electric direct current with the help of slipperings it is known to realise the electric current transmission to the rotating rotor inductively, i.e. wirelessly. Such a construction as part of an externally excited synchronous machine is also referred to as "rotary transformer" or "rotating planar transformer".

The function principle of the said inductive energy transmission is based on an electric transformer, wherein the primary current of the transformer is arranged on the stator of the synchronous machine and the secondary coil on the rotating rotor. Since with the inductive energy transmission in the secondary coil an electric alternating voltage is always generated initially it is necessary to electrically rectify, i.e. convert into an electric direct voltage with the help of a suitable rectifier circuit, which can be likewise arranged on the rotor.

In synchronous machines known from the prior art it is also known to arrange a rotary transformer outside the synchronous machine thus configuring it so as to be easily accessible and also easily manufacturable. In an arrangement of the rotary transformer outside the externally excited synchronous machine it is possible to construct the rotary transformer in steps, namely on the one hand a rotary transformer rotor and on the other hand a rotary transformer stator. Disadvantageous with such a construction however is the comparatively large space requirement of the rotary transformer outside the synchronous machine. For this reason there are also considerations of installing the rotary transformer in the synchronous machine which however cannot be realised or only with difficulty since a step-by-step assembly as with a rotary transformer arranged outside the synchronous machine is not possible here. At the same time, a balancing of a rotor of the synchronous machine becomes significantly more difficult since the rotary transformer cannot be balanced together with the rotor. In addition, a large number of interfaces are created when the rotary transformer is installed in the synchronous machine, which is likewise disadvantageous.

The present invention therefore deals with the problem of stating for a rotor for an externally excited synchronous machine of the generic type an improved or at least an alternative embodiment, with which the disadvantages known in an arrangement of the rotary transformer in the synchronous machine can be overcome.

According to the invention, this problem is solved through the subject of the independent claim(s). Advantageous embodiments are subject of the dependent claims.

SUMMARY

The present invention is based on the general idea of installing a rotary transformer of an externally excited synchronous machine into the same and in the process arranging a rotary transformer rotor on a balancing ring of the rotor while the rotary transformer stator is arranged on the synchronous machine, for example on a housing of the same. The rotor according to the invention for such an externally excited synchronous machine has a rotor shaft with rotor windings arranged thereon and a balancing ring for offsetting any unbalances. Likewise provided is a rectifier that is electrically connected to the rotor windings, which rectifier converts the alternating voltage originating of a rotary transformer into a direct voltage. According to the invention, a rotary transformer rotor of the rotary transformer with a secondary coil is now arranged on the balancing ring, which secondary coil projects from the rotor windings in the axial direction away from the balancing ring. The balancing ring is thus part of the (synchronous machine) rotor, wherein a rotating secondary coil, i.e. the rotary transformer rotor is part of the rotary transformer and integrated in the rotor. Such a rotor offers the major advantage that the rotary transformer rotor with the secondary coil arranged on the balancing ring can be comparatively easily balanced together with the rotor and at the same time a simple assembly of the rotary transformer by inserting the secondary coil arranged on the rotor in a rotary transformer stator arranged on the synchronous machine is made possible. Thus, a separate preassembly both of the rotary transformer rotor and also of the rotary transformer stator is possible. In addition, a particular advantage is that the rotary transformer stator usually comprising a transformer core is arranged in a stationary manner on the synchronous machine, in particular on a housing of the same and thus does not co-rotate, as a result of which high rotational speeds of the rotor are possible.

In an advantageous further development of the rotor according to the invention, the balancing ring, the rectifier and the secondary coil form a prefabricated assembly. Thus it is possible to manufacture and assemble the secondary coil in a separate prefabrication process and, following the joining to the rotor, merely perform minor adjustments on the balancing ring with respect to any unbalances that may still be present. By configuring the balancing ring together with the rectifier and the secondary coil as prefabricatable or prefabricated assembly, a final assembly process of the synchronous machine can be significantly shortened since the prefabrication of the assembly can be outsourced in a separate assembly process. Thus, this prefabrication can run for example parallel to the prefabrication of the rotor as a result of which the rotor manufacturing time as a whole can be shortened. In addition, quality processes defined for the prefabricated assembly can already be passed through in advance, as a result of which the quality assurance can be improved.

Practically, the secondary coil, the rectifier and the balancing ring are glued, welded, soldered, screwed, pressed, clipped and/or cast to/with one another, in particular cast in a common plastic matrix. Even this non-conclusive listing shows the manifold possibilities of the connecting techniques that are available, wherein in particular a common casting in a plastic does not only make possible easier handling but accommodates the individual components, in particular the rectifier and the secondary coil, so as to be protected for example against dirt. For a better maintenance a screwing or clipping of the individual components to one another is conceivable, so that for example in the case of a defective rectifier the same can be comparatively easily disassembled from the secondary coil or the balancing ring and subsequently a new rectifier assembled and the entire assembly, reusing the existing balancing ring and the existing secondary coil can then continue to be reused. A clipping together additionally makes possible a comparatively simple and quick mounting of the assembly even by unskilled workers or automatically, i.e. mechanically, similar to for example a screw connection.

In a further advantageous embodiment of the rotor according to the invention, the secondary coil comprises a coating and, via this coating, for example a plastic casing, is electrically insulated relative to a surroundings. Thus, a protected arrangement of the secondary coil under the coating is likewise possible and in addition a comparatively tight gap dimension between rotary transformer rotor and rotary transformer stator. By way of such a tight gap dimension, the rotary transformer can be operated particularly efficiently.

In a further advantageous embodiment of the rotor according to the invention, the secondary coil is arranged annularly about a rotary axis of the hollow rotor shaft. Such an annular configuration of the secondary coil about a rotary axis of the hollow rotary shaft makes possible configuring the secondary coil for example as hollow cylinder while a transformer core of a rotary transformer stator interacting therewith can likewise be embodied annularly with an axially open gap, into which the secondary coil of the rotary transformer rotor can be inserted during the assembly of the synchronous machine. The annular secondary coil of the rotary transformer rotor projects in the axial direction for example from the balancing ring and, during the assembly of the electric externally excited synchronous machine, can thus be comparatively easily inserted into the opposite recess of the transformer core that is open in the axial direction.

In an advantageous further development of the solution according to the invention, the rectifier is arranged radially within the balancing ring and/or supports itself on a radial step of the balancing ring or an inner lateral surface of the balancing ring. By supporting the rectifier on the balancing ring, the forces that occur on the rectifier during the operation of the electric externally excited synchronous machine, in particular centrifugal forces, can be better absorbed than for example solely via a fastening technique, such as for example glueing. In the aforementioned case, the glueing would merely prevent an axial displacement between rectifier and balancing ring while the offsetting of the centrifugal forces occurring during the operation of the synchronous machine is brought about via the balancing ring supporting the rectifier.

Practically, end windings of the rotor windings are arranged on the face-end side of the rotor windings, wherein the rectifier and the balancing ring form a housing surrounding the end windings and at the same time electronic components such as for example diodes of the rectifier are arranged in a housing interior of this housing. The rotor shaft is configured hollow and comprises a cooling channel for conducting coolant, which is communicatingly connected to the housing interior and thus also communicatingly connected to the electronic components of the rectifier and the end windings of the rotor windings, so that by conducting coolant through the cooling channel both the end windings of the rotor windings and also the electronic component of the rectifier be cooled. Thus, a significantly increased efficiency of the synchronous machine is possible. By way of the hollow rotor shaft, it is additionally not only possible to bring about a cooling, but resources and weight are also saved.

Further, the present invention is based on the general idea of equipping an externally excited synchronous machine with, in the preceding paragraphs, an electrically energisable rotor and thus achieve a comparatively simple construction of the synchronous machine with which not only a comparatively simple balancing operation of the rotor but also a reduced installation space requirement because of the installation of the rotary transformer in the synchronous machine can be achieved. Since the comparatively heavy transformer core with the primary coil in the case of the synchronous machine according to the invention is arranged on the synchronous machine, for example on a housing of the same or a bearing, the same does not co-rotate as a result of which comparatively high rotational speeds of the synchronous machine can be achieved. The transformer core comprises a magnetic core material, preferentially of a ferrite.

The synchronous machine can be configured as traction motor of a motor vehicle.

Practically, the transformer core comprises an inner ring, an outer ring and a stator bridge connecting the inner ring and the outer ring in each case on a face-end, wherein the primary coil of the rotary transformer stator is arranged in a recess on the interior ring of the transformer core and wherein between the inner ring and the outer ring an annular recess that is open in the axial direction is provided. Through such a configuration a in particular comparatively simple mounting of the rotor to the stator of the synchronous machine by simple axial displacement of the rotor, during which the secondary coil of the rotary transformer rotor is inserted into the recess of the rotary transformer stator, can be achieved.

The simplified mounting with a highly integrated rotary transformer, or with an integration of the rotary transformer in the interior space of the synchronous machine is also obtained in particular in that the secondary coil during the rotor mounting can be simply “inserted”. This results in a reduction of the number of mounting steps (during the final assembly), wherein at the same time a mounting with an arrangement in an interior space of the synchronous machine is made possible. No two-piece core is necessary either or the core can be completely arranged on the inner side of the bearing shield. Further, this embodiment has the advantage that the rotary transformer, despite the radial arrangement/design (almost) has/requires no rotating ferrite material or the rotating secondary winding/secondary coil (almost) contains no ferrite material.

Further important features and advantages of the invention are obtained from the subclaims, from the drawings and from the associated figure description by way of the drawings.

It is to be understood that the features mentioned above and still to be explained in the following cannot only be used in the respective combination stated but also in other combinations or by themselves without leaving the scope of the present invention.

Preferred exemplary embodiments of the invention are shown in the drawings and are explained in more detail in the following description.

BRIEF DESCRIPTION OF THE DESCRIPTION OF THE DRAWINGS

Figure 2:
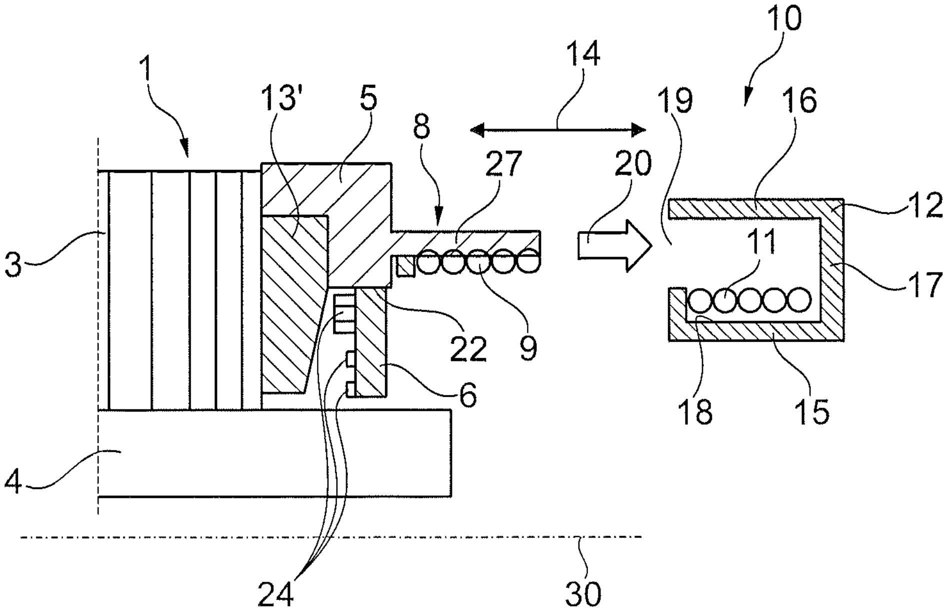
Figure 3:
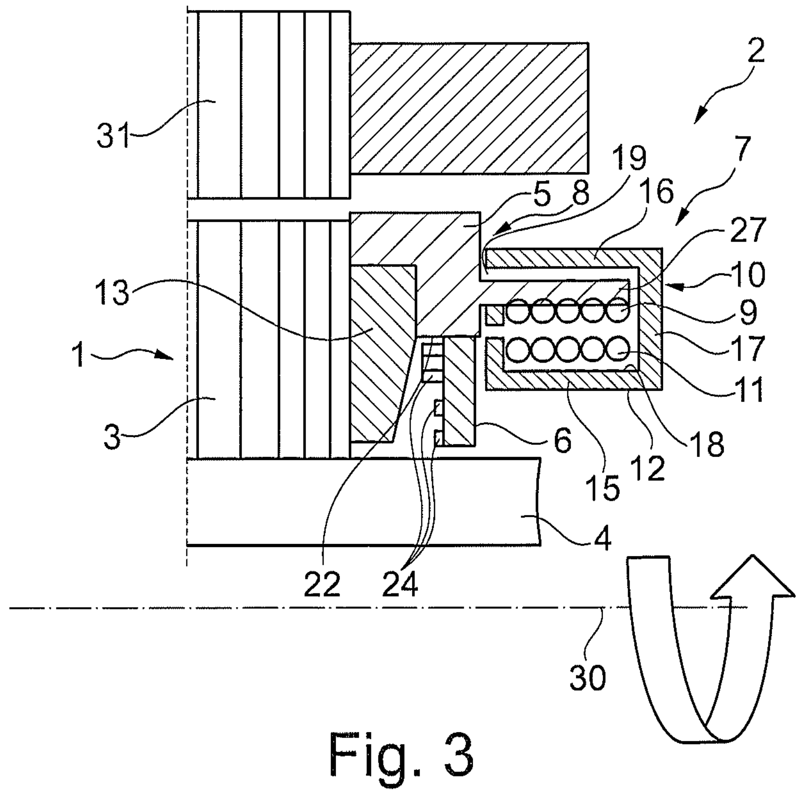
Figure 4:
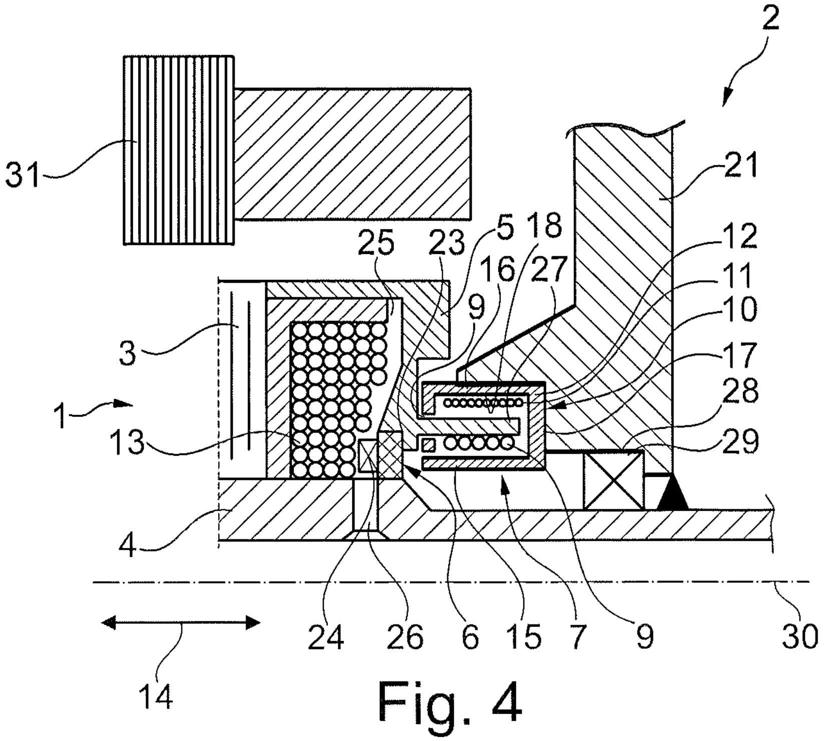

There it shows, in each case schematically:

FIG. 1: a longitudinal sectional representation through a rotor of an electric externally excited synchronous machine according to the prior art, FIG. 2: a sectional representation through a synchronous machine according to the invention during an assembly of a rotor, FIG. 3: a representation as in FIG. 2, however in the mounted state, FIG. 4: a representation as in FIG. 3, however with another embodiment.

DETAILED DESCRIPTION

According to FIG. 1, a rotor 1' of an electric externally excited synchronous machine 2' which is otherwise not shown in more detail, comprises rotor windings 3', which are arranged on a hollow rotor shaft 4'. Likewise provided is a balancing ring 5' for offsetting any unbalances that may occur. In order to be able to convert an alternating current into direct current a rectifier 6' is additionally provided, which in this case is non-rotatably arranged on an outer lateral surface of the hollow rotor shaft 4'. The rectifier 6' is electrically connected on the one hand to the rotor windings 3' and on the other hand to a rotary transformer 7'. The rotary transformer 7' in turn has a rotary transformer rotor 8' with a secondary coil 9' and a rotary transformer stator 10' with a primary coil 11'. The rotary transformer stator 10' additionally has a transformer core 12' of a magnetic core material, in particular of a ferrite. The magnetic core material or the transformer core 12' is arranged in a stationary manner. The end windings 13' of the rotor windings 3' are also located at the face-end of the rotor windings 3'.

Disadvantageous with the rotor 1' known from the prior art or with an externally excited synchronous machine 2' equipped with such a rotor 1' is that both an assembly of the synchronous machine 2' and also a balancing of the rotor 1 are extremely difficult. The reason for this in particular is that the rotary transformer 7' cannot be balanced together with the rotor 1'. In addition, there are also a large number of interfaces.

In the following FIGS. 2 to 4, a rotor 1 according to the invention and an externally excited synchronous machine 2 according to the invention are therefore described, which no longer have the disadvantages known from the prior art. The same reference numbers are used for individual components in FIGS. 2 to 4 as in FIG. 1, however without apostrophe, in order to make possible an unambiguous distinction between a rotor 1' according to the prior art and a rotor 1 according to the invention or a synchronous machine 2 according to the invention.

The rotor 1 according to the invention shown in FIGS. 2 to 4 for an externally excited synchronous machine 2 likewise has a hollow rotor shaft 4 on which rotor windings 3 are arranged. Further, a balancing ring 5 for offsetting any unbalances of the rotor 1 that may be present is also provided. In order to be able to convert an alternating current provided by the rotary transformer 7 for generating a magnetic field in the rotor windings 3 into a direct current, a rectifier 6 is provided which is connected both to the rotary transformer 7 or the secondary coil 9 of the rotary transformer rotor 8 of the rotary transformer 7, and also to the rotor windings 3 or their end windings 13.

According to the invention, the previously described rotary transformer rotor 8 of the rotary transformer 7 with a secondary coil 9, which projects from the balancing ring 5 in the axial direction 14, is now arranged on the balancing ring 5.

The balancing ring 5, the rectifier 6 and also the secondary coil 9 can form a prefabricatable or prefabricated assembly which can be mounted to the rotor 1 in the prefabricated state. The secondary coil 9, the rectifier 6 and the balancing ring 5 can be for example glued, soldered, welded, screwed, pressed, clipped and/or cast to one another, in particular cast into a plastic matrix. In particular the last variant makes possible an arrangement of the previously mentioned components 5, 6, 9 so as to be protected under a plastic film or casing and a simple handling of this assembly consisting of at least the components 5, 6 and 9. The major advantage of such an assembly is that the same can be prefabricated separately from the rotor, for example in parallel, as a result of which the assembly and manufacturing process of the rotor 1 according to the invention as a whole can be shortened; when the secondary coil 9 is encased in a plastic matrix, the same is coated with plastic and thus electrically insulated relative to the surroundings.

The synchronous machine 2 according to the invention has the previously mentioned rotary transformer stator 10 (see FIGS. 2 to 4) with a primary coil 11 and a transformer core 12, which is usually configured of a magnetic core material, preferentially of a ferrite. The transformer core 12 is arranged in a stationary manner, i.e. it does not rotate during the operation of the synchronous machine 2, as a result of which the rotor 1 of the synchronous machine 2 according to the invention can achieve significantly higher rotational speeds.

Viewing the transformer core 12 in more detail it is noticeable that the same comprises an inner ring 15, an outer ring 16 and a stator bridge 17 connecting the inner ring 15 and the outer ring 16 in each case on a face-end, wherein the primary coil 11 is arranged in a recess 18 on the inner ring 15 (see FIGS. 2 and 3). Alternatively, an arrangement of the primary coil 11 in a recess 18' of the outer ring 16 is obviously also conceivable, as is shown according to FIG. 4.

The synchronous machine 2 can be configured as traction motor of a motor vehicle.

According to FIGS. 1 to 3, the primary coil 11 and the secondary coil 9 are located directly opposite one another while according to FIG. 4 they are still separated by a carrier web 27. Since a magnetic flux closes via the ferrite core (transformer core 12) the carrier web 27 does not interfere provided the same is formed of a non-magnetic and electrically non-conductive material. The carrier web 27 is able of supporting the secondary coil 9 since high centrifugal forces acting on the same during the operation. Because of the comparatively small distance of the rotating secondary coil 9 in FIG. 4 from the rotary axis 30, only smaller centrifugal forces act on the secondary coil 9 with the embodiment according to FIG. 4, as a result of which besides the support of the secondary coil 9 by the carrier web 27 a higher rotational speed stability can be achieved.

Between the inner ring 15 and the outer ring 16 an annular recess 19 is additionally arranged, in which the annular secondary coil 9 of the rotary transformer rotor 8 engages.

During the assembly process, as shown according to FIG. 2, the secondary coil 9 projecting from the rotor windings 3 or the balancing ring 5 in the axial direction can be inserted in the insertion direction 20 into the recess 19 of the transformer core 12 and the rotary transformer 7 thus produced. Thus, a comparatively simple installation of the rotor 1 in the synchronous machine 2 is possible. The transformer core 12 or the rotary transformer stator 10 can be arranged for example on a housing 21 of the synchronous machine 2 but also on a bearing flange 28.

Further, the embodiment according to the invention has the advantage that the rotary transformer 7, despite the radial arrangement/design has/requires (almost) no rotating ferrite material or the rotating secondary coil 9 contains (almost) no ferrite material. In the figures, merely a piece of (rotating) ferrite core is indicated in the region of the secondary coil 9 which serves for reducing an air gap and thus reducing the leakage inductance and increase the efficiency of the rotary transformer 7. The ferrite core, furthermore, is (primarily) embodied as fixed stationary ferrite core, as a result of which the rotating ferrite material is minimised. Because of the poor mechanical properties (brittle, low rotational speed stability) of the ferrite material, higher rotational speeds can be realised with this construction than with a construction having the rotating ferrite core/ferrite material.

Viewing FIGS. 2 to 4 further it is noticeable that the rectifier 6 is arranged radially within the balancing ring 5 and supports itself on this or an inner lateral surface 22 of the balancing ring 5 (see FIGS. 2 and 3). Alternatively it is obviously also conceivable that the rectifier 6 supports itself on a radial step 23 of the balancing ring 5 as is shown according to FIG. 4, as a result of which the rectifier 6 can be held positively locked both in the radial direction and in the axial direction 14.

In addition, the rotor 1 or its rotor windings 3 have end windings 13, wherein the balancing ring 5 engages about the end windings 13 on an outer lateral surface and on an axial face-end, as is shown according to FIGS. 2 to 4. Purely theoretically it is also conceivable that the rectifier 6 and the balancing ring 5 form a housing (see FIG. 4) surrounding the end windings 13, wherein electronic components 24 of the rectifier 6, such as for example diodes, are arranged in a housing interior 25. Thus, a protected arrangement of the electronic components 24 is possible. In addition, the rotor shaft 4 can be configured so as to be hollow and comprise a cooling channel 26 for conducting coolant, wherein this cooling channel 26 is communicatingly connected to the housing interior 25. Thus a cooling both of the end windings 13 of the rotor windings 3 arranged in the housing interior 25 and also of the electronic components 24 of the rectifier 6 is possible as a result of which altogether an output increase of the synchronous machine 2 according to the invention can be achieved.

In order to make possible cooling the housing interior 25 and the components 13 and 24 arranged therein, the rectifier 6 with its conductor board is connected preferentially in a fluid-tight manner, to an outer lateral surface of the rotor shaft 4, as a result of which the housing interior 25 is merely accessible via the cooling channel 26. In this case, the assembly consisting of balancing ring 5, secondary coil 7 and rectifier 6 is tightly connected on the one hand to the outer lateral surface of the rotor shaft 4 and on the other hand to a face-end of the rotor windings 3, for example glued. The balancing ring 5 can also comprise the annular carrier web 27 which is integrally formed with the balancing ring 5 and on which the secondary coil 9 with its windings is fixed.

According to FIG. 4, the rotor shaft 4 of the rotor 1 is mounted on the housing 21 via the bearing flange 28 and a bearing 29 arranged there. Surrounding the rotor 1, a stator 31 of the synchronous machine 2 with corresponding stator windings is arranged as shown according to FIGS. 3 and 4.

With the rotor 1 according to the invention and the synchronous machine 2 according to the invention a horizonal and axial arrangement both of the secondary coil 9 and also of the primary coil 11 about a rotary axis 30 of the rotor 1 is possible, as is also an integration of the secondary coil 9 in the balancing ring 5. By installing or integrating the primary coil 11 and the transformer core 12 in the housing 21 or the bearing flange 28 of the synchronous machine 2, a significantly simplified assembly of the synchronous machine 2 with short circulation time in the production can be achieved at the same time. At the same time, a simple balancing operation together with the rotor 1 is also possible.

Such a balancing operation previously worked as follows: usually, the rotor 1' of the synchronous machine 2' has two so-called balancing shields or balancing rings 5' at both ends which of a comparatively heavy material, in particular steel, are arranged on a large diameter (based on the rotary axis 30'). The rotor 1' is received on the bearing seeds, rotated and the unbalance occurring at a predetermined rotational speed established. Following this, the rotor 1' is balanced through balancing bores (removal of material) or glueing on of balancing weights (addition of material).

Since the rotating secondary coil 9 of the rotary transformer rotor 8 is part of the rotor 1 according to the invention or is integrated in the same, both components can be balanced in a common balancing process as a result of which lower process times and costs are obtained. This is especially practical also because no magnetic or electrically conductive material can be employed in the interior of the rotary transformer 7 (and thus directly on the secondary coil 9) because of the shielding effects to be avoided. At the same time, the secondary coil 9 itself has copper with a significantly higher density than the corresponding carrier material (plastic, plastic composite material, etc.), as a result of which the balancing of the rotary transformer rotor 8 is elaborate.

Since the transformer core 12 is arranged in a stationary manner on the synchronous machine 2, for example on its housing 21, the rotor 1 can additionally achieve high rotational speeds.

The invention claimed is:

1. A rotor for an externally excited synchronous machine, comprising:

rotor windings arranged on a rotor shaft, a balancing ring, a rectifier electrically connected to the rotor windings, wherein on the balancing ring a rotary transformer rotor of a rotary transformer with a secondary coil is arranged, the rotary transformer rotor projects from the balancing ring in an axial direction; and wherein the rectifier is arranged radially within the balancing ring and supports itself on a radial step of the balancing ring or on an inner lateral surface of the balancing ring.

2. The rotor according to claim 1, wherein the balancing ring, the rectifier and the secondary coil form a prefabricated assembly.

3. The rotor according to claim 2, wherein the secondary coil, the rectifier and the balancing ring are glued, welded, soldered, screwed, pressed, clipped and/or cast to/with one another.

4. The rotor according to claim 1, wherein the secondary coil comprises a coating and is electrically insulated relative to a surroundings.

5. The rotor according to claim 1, wherein the secondary coil is arranged annularly about a rotary axis of the hollow rotary shaft.

6. The rotor according to claim 1, wherein:

at the face-end of the rotor windings, end windings are arranged, the rectifier and the balancing ring form a housing surrounding the end windings, wherein electronic components of the rectifier are arranged in a housing interior, and the rotor shaft is configured hollow and comprises a cooling channel for conducting coolant, which is communicatingly connected to the housing interior.

7. An externally excited synchronous machine, comprising an electrically energisable rotor, the rotor including:

a rotor shaft including rotor windings arranged thereon, a balancing ring, a rectifier electrically connected to the rotor windings, a rotary transformer arranged on the balancing ring and including a rotary transformer rotor with a secondary coil arranged on the rotary transformer rotor, wherein the rotary transformer rotor projects from the balancing ring in an axial direction;

a rotary transformer stator with a primary coil and a transformer core of a magnetic core material; and wherein the transformer core comprises an inner ring, an outer ring and a stator bridge connecting the inner ring and the outer ring in each case on a face-end, wherein the primary coil is arranged in a recess on the inner ring, and wherein between the inner ring and the outer ring an annular recess is arranged.

8. The externally excited synchronous machine according to claim 7, wherein the secondary coil of the rotary transformer rotor engages in the annular recess of the transformer core.

9. The externally excited synchronous machine according to claim 7, wherein the balancing ring, the rectifier and the secondary coil form a prefabricated assembly.

10. The externally excited synchronous machine according to claim 9, wherein the secondary coil, the rectifier and the balancing ring are glued, welded, soldered, screwed, pressed, clipped and/or cast to/with one another.

11. The externally excited synchronous machine according to claim 7, wherein the secondary coil comprises a coating and is electrically insulated relative to a surroundings.

12. The externally excited synchronous machine according to claim 7, wherein the secondary coil is arranged annularly about a rotary axis of the hollow rotary shaft.

13. The externally excited synchronous machine according to claim 7, wherein the rectifier is arranged radially within the balancing ring.

14. The externally excited synchronous machine according to claim 7, wherein the rectifier supports itself on a radial step of the balancing ring.

15. The externally excited synchronous machine according to claim 7, wherein the rectifier is arranged on an inner lateral surface of the balancing ring.

16. The externally excited synchronous machine according to claim 7, wherein:

end windings are arranged at a face-end of the rotor, the rectifier and the balancing ring form a housing surrounding the end windings, wherein electronic components of the rectifier are arranged in a housing interior, and the rotor shaft is configured hollow and comprises a cooling channel for conducting coolant, which is communicatingly connected to the housing interior.

* * * * *